United States Patent [19]

Roth et al.

[11] Patent Number: 5,243,650
[45] Date of Patent: Sep. 7, 1993

[54] METHOD AND APPARATUS FOR ENCRYPTION/DECRYPTION OF DIGITAL MULTISOUND IN TELEVISION

[75] Inventors: Göran Roth, TrÅngsund; Rolf Hulthén, Bromma; Bo Sjöberg, Farsta, all of Sweden

[73] Assignee: Televerket, Farsta, Sweden

[21] Appl. No.: 673,408

[22] Filed: Mar. 22, 1991

[30] Foreign Application Priority Data

Mar. 23, 1990 [SE] Sweden .............................. 9001078

[51] Int. Cl.$^5$ .............................................. H04N 7/167
[52] U.S. Cl. ........................................ 380/19; 380/10; 380/20; 380/46; 380/48; 380/49
[58] Field of Search .............. 380/6, 7, 9, 10, 19, 380/20, 49, 30, 37, 42, 43, 46, 48

[56] References Cited

U.S. PATENT DOCUMENTS

| | | | |
|---|---|---|---|
| 2,957,939 | 10/1960 | Morris | 380/20 |
| 4,809,274 | 2/1989 | Walker et al. | 380/19 X |
| 4,870,682 | 9/1989 | Morrey et al. | 380/19 X |
| 4,908,860 | 3/1990 | Caprarese et al. | 380/19 |

*Primary Examiner*—Bernarr E. Gregory
*Attorney, Agent, or Firm*—Oblon, Spivak, McClelland, Maier & Neustadt

[57] ABSTRACT

The present invention relates to methods and apparatus for encryption and decryption, respectively, of digital sound in television. The decryption takes place in two steps. The first step, encryption with running key, is achieved by adding modulo 2 a pseudo random sequence to the digital signal containing a sound information. The pseudo random sequence is preferably generated by a non-linear feedback register initialized by the control word. The second step involves encryption of the control word, thereby being transmitted to the receiver in ciphered form. The encryption is preferably achieved by a microprocessor also performing coding of the control word for forward error correction. The control word in turn is generated by a true random sequence generator. The invention enables an encryption that is secure against breaking without deteriorating the sound quality and also enables efficient handling of the key of the encryption.

11 Claims, 3 Drawing Sheets

METHOD AND APPARATUS FOR ENCRYPTION/DECRYPTION OF DIGITAL MULTISOUND IN TELEVISION

FIELD OF INVENTION

The present invention relates to methods and apparatus for encryption and decryption, respectively, of digital sound. The invention is especially intended for applying to digital sound transmitted in the NICAM format. The invention comprises scrambling the signal by encryption with running key and encryption of control words controlling the running key.

STATE OF THE ART

Encryption of analogous signals today exists in cable television. However, when the encryption is performed on analog signals, it results in a certain deterioration of the quality. No matter how good the equipment is, a certain distorsion is always introduced in encryption and decryption of an analog signal. In addition, it is rather difficult to achieve a really forceful and secure encryption of analog signals.

In encrypting a digital signal it is significantly easier to achieve a forceful and secure encryption. The signal may still be reproduced perfectly on the receiver side, since it is not necessary to determine a precise level but only to make the decision "1" or "0".

TECHNICAL PROBLEM

Encryption of digital sound is used today in satellite television. This encryption systems may however not be used directly in terrestrial transmission, since there is a problem with multiple path propagation. In satellite transmission the receiving aerial has a very narrow lobe resulting in that you never get this problems. Recently a digital system for terrestrial transmission of stereo sound, called NICAM (Near Instantaneous Companded Audio Multiplex). The NICAM system is less susceptible to multiple path propagation. The present invention relates to encryption of digital sound transmitted in the NICAM format or similar. Thus, the problem with multiple path propagation is avoided.

SUMMARY OF THE INVENTION

The invention allows a simple and secure encryption through a method, wherein the digital signal transmitted on the channel is scrambled by adding a binary pseudo random sequence modulo 2 to the digital sound, i.e. encryption with a running key. To reproduce the original signal the same sequence is added on the receiver side. The binary pseudo random sequence is generated by a pseudo random sequence generator. The sequence is controlled by a so called control word, randomly generated on the transmitter side and changed at suitable intervals. The control word is encrypted and transmitted to the receiver, where it is decrypted and transmitted to the pseudo random sequence generator of the receiver.

The invention also relates to apparatus for encryption and decryption, respectively, for carrying out the method. Further embodiments of the invention are set forth in the accompanying claims.

BRIEF DESCRIPTION OF THE DRAWINGS

The invention will now be described in detail with reference to the accompanying drawings, in which.

DETAILED DESCRIPTION OF THE PREFERRED EMBODIMENTS OF THE INVENTION

Figure 1:
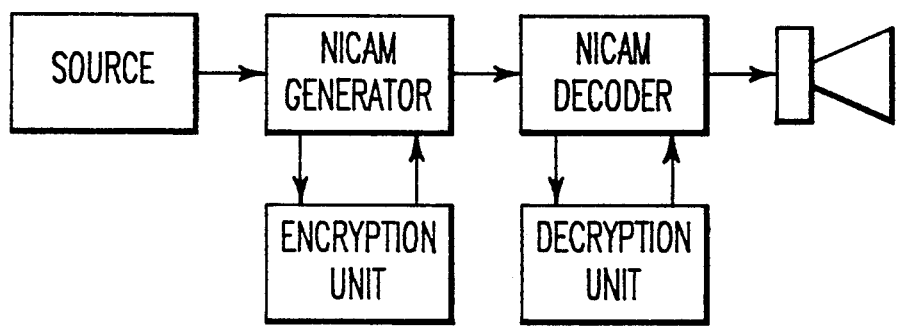
FIG. 1 is an overview block diagram of the invention.

In FIG. 1 an overview block diagram of the system in accordance with the invention is shown. The source supplies a digital signal containing the sound information for the television transmission. The sound may be in stereo or mono and data may also be transmitted in accordance with the NICAM format described below. In the NICAM generator the signal is formated. If the signal is not to be encrypted it is transmitted directly by air or cable to the receiver where the signal is decoded in a NICAM decoder to reproduce the analogous sound. However, in accordance with the present invention, the formated signal is first delivered to an encryption unit, in which the signal is encrypted before it is transmitted to the receiver. In the receiver there is a corresponding decryption unit.

Figure 2:
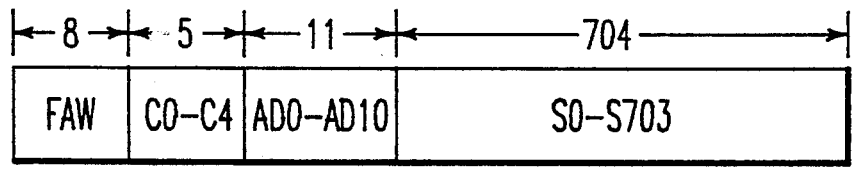
FIG. 2 is a diagram of the NICAM format.

FIG. 2 shows how the NICAM format is designed. NICAM is a standard format developed for digital stereophonic sound. The system allows transmission in stereo or two separate mono channels or of data. In FIG. 2 one NICAM frame is shown. Each frame comprises 728 bits and they are transmitted with a speed of 1000 frames per second, i.e. a total bit rate of 728 kbit/s. Each frame begins with a frame alignement word FAW consisting of eight bits. Thereafter, five control bits C0-C4 are transmitted, which for instance determines the type of information being transmitted. Then there is 11 additional data AD bits AD0-AD10, which may be used for transmitting optional information. In accordance with the present invention preferably the first bit AD0 is utilized to transmit a control word and the cryptosyn-chronization word, which will be described more in detail below. At the end of each frame the 704 sound and/or data information bits to be encrypted are transmitted.

According to the invention a pseudo random sequence is added modulo 2 to the information bits. The term pseudo random sequence relates to a sequence of ones and zeros which may be perceived as random but in fact is predictable if an initialization word is known and how the sequence is generated. It is this fact that makes the reproduction of the sequence on the receiver side possible. Thus, an initialization word or a control word has to be transmitted between the transmitter and the receiver. In order to increase the level of encryption the control word is encrypted before it is transmitted. The key of the latter encryption may be handled in different ways which does not form any part of the present invention.

Figure 3:
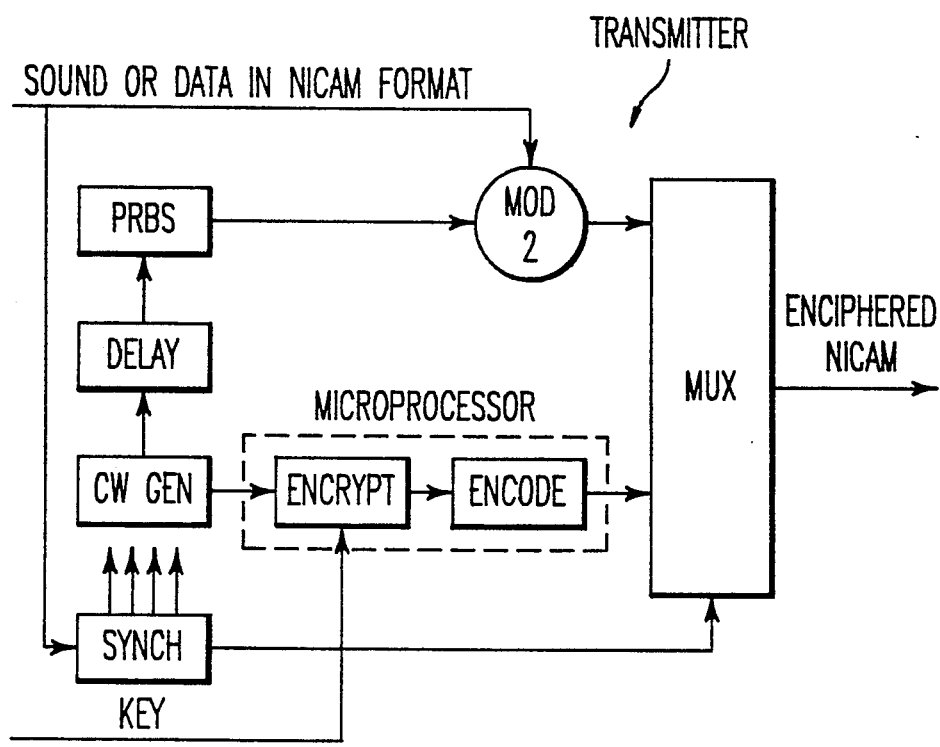
FIG. 3 is a block diagram of the transmitter in accordance with the invention.

In FIG. 3 the design of the encryption unit on the transmitter side is shown. Sound or data in NICAM format together with the key controlling the encryption algorithm enters the encryption unit. A pseudo random generator PRBS generates a pseudo random binary sequence. This is described more in detail below with reference to FIG. 5. An adder mod 2 adds the pseudo random sequence modulo 2 to the 704 input sound/data bits per NICAM frame. The pseudo random generator is initialized by a control word generated by a control word generator CW gen. A delay unit serves to load the control word into the pseudo random generator at the right point of time. The control word is not transmitted in plaintext but encrypted in the encryption unit to prevent unauthorized use. In addition to the encryption the control word needs to be protected in form of an error correcting code. This error correction is performed in the encoding unit. A synchronization unit Synch generates suitable control signals to the other units using the frame alignment word FAW. A synchronization word allowing a receiver to find the start of the control word is also introduced just before the control word. The introduction of this cryptosynchronization word and the control word at the right point of time in the NICAM frame is achieved by a multiplexor MUX.

The control word, after encryption and error correction, is about 300 bits together with the synchronization word, and the control word is replaced at suitable intervals. As it is undesired to increase the transmission speed by transmitting information besides the NICAM frames, it is natural to use the additional data bits. It is perfectly sufficient to use only one bit per NICAM frame, resulting in the bit rate of 1000 bits per second. Another possibility of transmitting the control word is to use the Vertical Blanking Interval, VBI, where currently for instance teletext is located.

Figure 4:
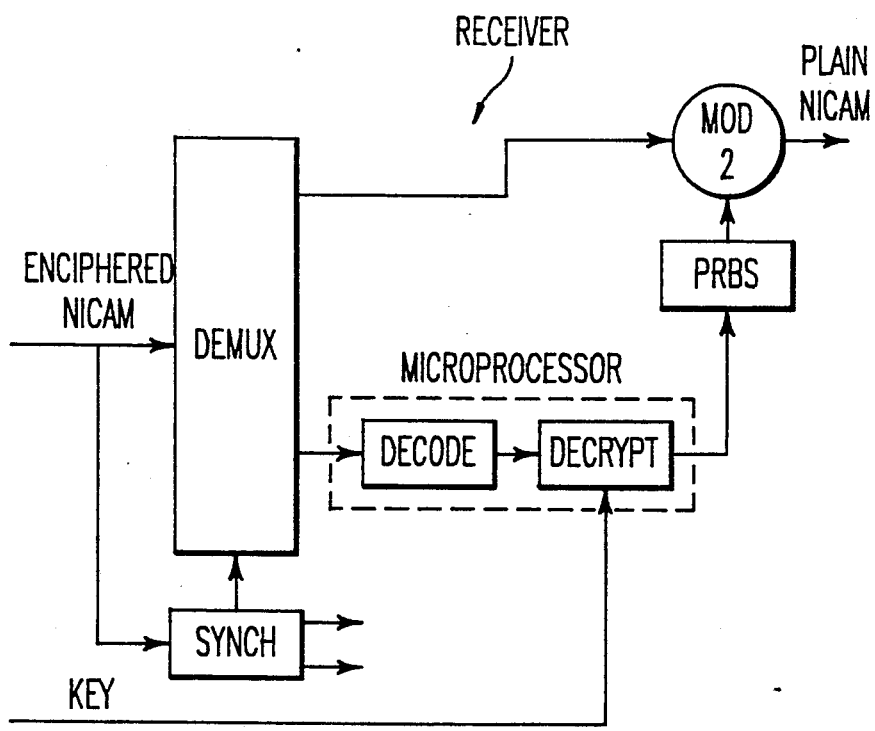
FIG. 4 is a block diagram of the receiver in accordance with the invention.

In FIG. 4 the corresponding receiver device according to the invention is shown. The enciphered NICAM signal enters the multiplexor DEMUX delivering the enciphered control word to a decoding and decrypting unit. The decrypted control word is loaded into a corresponding pseudo random binary sequence generator PRBS. The random sequence generated is added modulo 2 to the enciphered digital signal to reproduce the plain NICAM signal.

Figure 5:
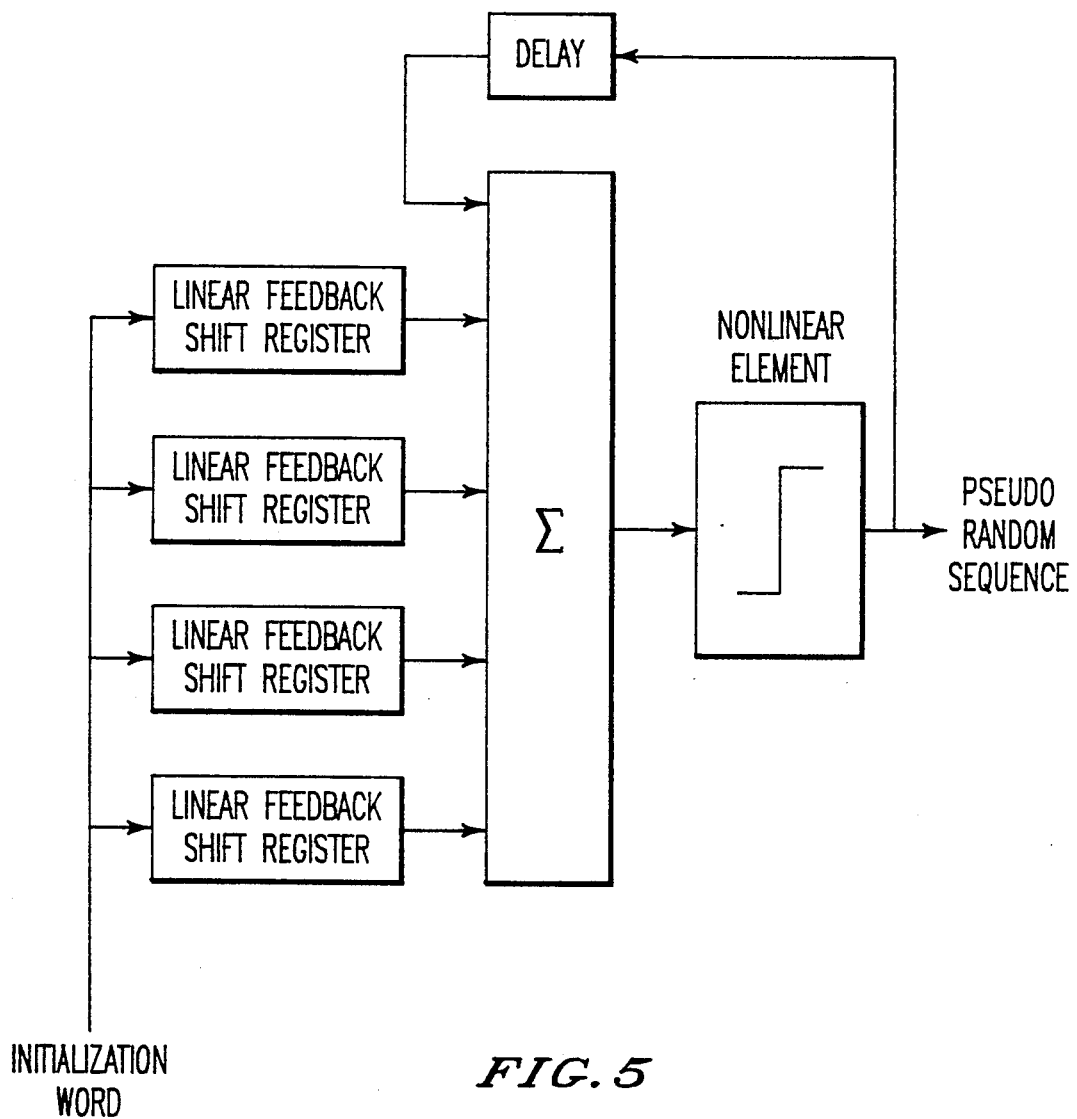
FIG. 5 is a block diagram of the pseudo random sequence generator included in the transmitter and receiver in accordance with the invention.

In FIG. 5 a preferred embodiment of the pseudo random sequence generator in accordance with the present invention is shown. As mentioned previously, a pseudo random sequence is a sequence which may be perceived as random, especially if it is very long so that there are many bits before it restarts and is repeated. A pseudo random sequence is generated in a rather simple way by using feedback shift registers. In the feedback the signal is taken from some of the outputs of the shift registers and is returned to the input via one (or several) XDR gates, in the figure represented by an adding block $\Sigma$. In order to further increase the length of the sequence a nonlinear feedback is provided by providing a nonlinear element after the linear feed back shift registers. The length of the sequence in such a feedback circuit will be approximately $2^{2n}$ if the shift register has a length of n bits. In accordance with a preferred embodiment of the invention the pseudo random sequence generator comprises four linear feedback registers, one adder and one decision making circuit. The shift registers have the lengths 13, 14, 15 and 17 bits, respectively. The adder and the decision-making circuit have been combined to a combinational circuit.

The sequence length of the generator is as long as a generator comprising one 59 bits shift register, where 59 is the sum of the four lengths of the shift registers. The sequence length is then approximately $2^{29} \approx 5.8 \times 10^{17}$.

Before the generator is started, an initialization word, not equal to zero, has to be read into the shift register, i.e. each of the latches of the shift registers, should assume a certain state. This initialization word, identical with the control word, determines wherein the sequence the start is. Thus, the length of the control word is 59 bits. In the exemplifying embodiment the generator is started with a new control word approximately once a second. Then it is clocked with the NICAM clock of 728 kHz and 704 bits/ms are used for the encryption of the sound. The remaining bits are not used for the encryption, since the frame alignment word, the control bits and additional data bits in the beginning of each NICAM frame are transmitted unciphered.

The control word is replaced at suitable intervals. In the embodiment described herein the control word is replaced continuously, i.e. new control words are transmitted each time. However, it is possible to let the same control word be valid during an extended time, for instance 60 seconds, thus, the same control word is being transmitted 60 times in a row. Changing control words less frequently makes it more difficult to break the encryption algorithm for the decryption of the control word, but, on the other hand, makes it easier to "guess" the control word and thus gaining access to the pseudo random sequence. Even if the same control is used for an extended period of time it is suitable to transmit it reasonably frequently, for instance once a second, so that possible bit errors generated during transmission do not knock out the system for a substantial period of time. A suitable interval to change the control word depends on the prescribed security level.

Thus, each second a new control word should be generated on the transmitter side. This is done in a control word generator generating a random sequence which is utilized to form the control word. The purpose of the control generator is to obtain a true random sequence in the sense not predictable sequence. If a pseudo random sequence was used there would be a possibility of predicting the control word once the code is broken. In that case the sound may be deciphered in the receiver without access to the decryption algorithm for the control word, i.e. without the control word having to be read when transmitted on the channel.

An error in the control word or synchronization word results in a sound drop out until the control word is read correctly the next time. That is why the error correction is performed by the coding and decoding units. In the present invention the code BCH (127,71) has been used with good results. The error correction does not form any part of the present invention and is therefore not described herein in greater detail.

The encryption of the control word is chosen so as to obtain good security against breaking. This may be accomplished in many ways known to a person skilled in the art. Preferably, a microprocessor common to the encryption and error correction units is used. The use of a micro-processor results in that the system is not constrained to any special encryption algorithm. It is quite simple to change the algorithm by reprogramming the microprocessor. A microprocessor is also cheap to manufacture.

The system is enciphered for two reasons. The first is to give only authorized users access to the system. The other is to provide at the same time a charging system for the system access; a user is authorized by paying the subscription fee. Therefore, the replacement of the encryption key must take place every new charging period. This can be achieved by providing the receiver in the manufacturing thereof with an individual and unique part of an encryption key, programmed into the microprocessor. The complementary part of the key is renewed every charging period and is distributed against payment of a subscription fee. The handling of the key does not in itself form a part of the present invention.

Thus, the present invention provides methods and apparatus for encryption/decryption of digital sound. The encryption is performed in two steps. The first step, encryption with running key, is a simple method to rapidly scramble large amounts av data and is implemented by simple hardware, whereas the second step may use advanced algorithms, since the amount of data in this case is small. By using micro-processors for this second step the security of the system is also increased, since the encryption algorithms can easily be changed. Above a preferred embodiment of the invention has been described, especially adapted for the NICAM format. Of course, a person skilled in the art appreciates that the invention may as well be applied to other formats. The invention is only limited by the claims below.

What is claimed is:

1. An apparatus for encryption of digital sound in a television environment with a digital signal being transmitted between a transmitter and a receiver, comprising:
    a generator generating a pseudo random sequence;
    a generator generating a control word for initialization of the pseudo random sequence;
    an adder adding to the digital signal containing a sound information the pseudo random sequence;
    an encryption unit for ciphering the control word before it is transmitted to the receiver and
    means to transmit said control word and said encrypted sound in a predetermined format such that said control word is sent in the same predetermined format as said encrypted sound.

2. An apparatus according to claim 1, wherein said control word generator comprises a random sequence generator generating an unpredictable sequence.

3. An apparatus according to one of claims 1 or 2, wherein:
    said encryption unit comprises a microprocessor for performing an error correction of the control word.

4. An apparatus according to claim 3 wherein:
    the pseudorandom sequence generator comprises a nonlinear feedback shift register.

5. An apparatus for decryption of digital sound in a television environment wherein a ciphered digital signal is transmitted between a transmitter and a receiver, comprising:
    a generator generating a pseudorandom sequence;
    a decryption unit deciphering from the ciphered signal a control word for initialization of the pseudorandom sequence;
    means for receiving said control word and said encrypted sound in a predetermined format including both said control word and the encrypted sound, such that the control word is delivered to said decryption unit; and
    an adder adding the pseudorandom sequence to the ciphered digital signal containing the sound information in order to reproduce the original sound signal.

6. Apparatus according to claim 5, characterized in that the decryption unit comprises a microprocessor also performing the error correction of the control word.

7. An apparatus according to claims 1, 2 or 5, wherein the pseudorandom sequence generator comprises a nonlinear feedback shift register.

8. A method of encryption and decryption of digitized sound, in a television environment wherein said sound is transmitted between a transmitter and receiver comprising the steps of in said transmitter:
    initializing a pseudo random number generator with a control word;
    ciphering and transmitting said digitized sound in a predetermined format; and
    sending as part of, and within said predetermined format, said control word; and
    in said receiver the steps of receiving said predetermined formatted signals from said transmitter;
    decoding said control word so as to provide a pseudo-random number seed to a pseudo-random number generator; and
    deciphering said digitized sound based upon said pseudo-random number being generated by said pseudo-random number generator which has been seeded by said decoded control word.

9. A method according to claim 8, wherein said code word is replaced at periodic intervals.

10. A method according to claims 8 or 9, wherein:
    said predetermined format is a NICAM frame and said control word is preferably sent using the bit AD0 in successive NICAM frames.

11. A method according to claim 10 wherein: said control word is encoded for error correction.

* * * * *